Dec. 16, 1952     E. SZIGETI     2,621,990
PISTON RING
Filed Nov. 5, 1949
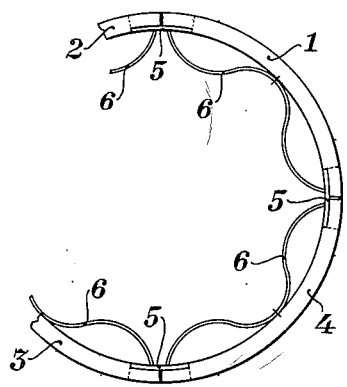
Fig. 1
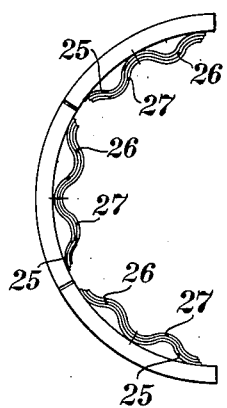
Fig. 2
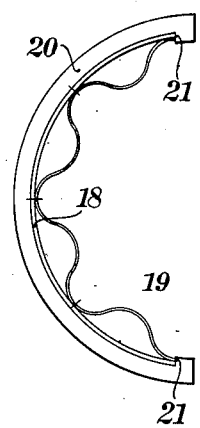
Fig. 3
Fig. 4
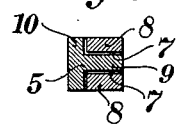
Fig. 6
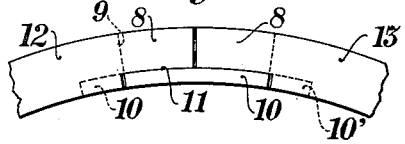
Fig. 5
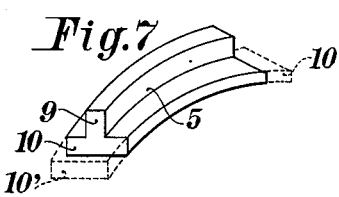
Fig. 7
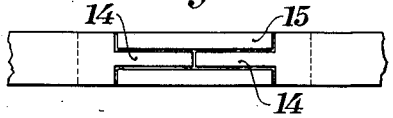
Fig. 8
Fig. 9
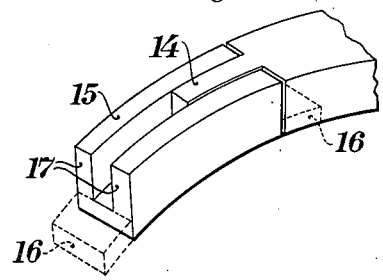
Fig. 10
Inventor:
Elemer Szigeti Patented Dec. 16, 1952

2,621,990

UNITED STATES PATENT OFFICE 2,621,990

PISTON RING

Elemér Szigeti, Vienna, Austria

Application November 5, 1949, Serial No. 125,744
In Austria November 6, 1948

7 Claims. (Cl. 309—47)

The invention relates to piston rings consisting of one or more parts in which the adjacent ends of the ring parts, which are pressed outwards by springs, are made to overlap both in the axial and radial direction by means of insets, and has for its object to perfect and improve these piston rings in regard to their design, function and technology.

The known piston rings consist of a plurality of parts. Each ring part forms at one end a forked portion and at its other end a portion of T cross section. The T-shaped portion of the one end of one ring part interengages the forked portion of the end of the other ring part. These ring parts are composed of individual parts, and the respective ends of two adjacent parts are supposed to roll on each other. Furthermore, there are piston rings the parts of which do not engage directly, but which are connected by intermediate parts. In both cases the design is complicated, and the manufacture of real piston rings is consequently difficult and expensive.

It is unfavorable for the function of a piston ring if the cross-sectional shape and dimension varies along the circumference of the ring, owing to the considerable expansion thereof caused by the permanently prevailing high temperatures in the cylinders of internal combustion engines. In this case unequal expansions and distortions are brought about, which impair the gliding capacity of the ring and the piston respectively on the cylinder walls and increase its wear. The known piston rings suffer from said drawbacks. If piston rings with insets are provided, the ring is interrupted, on a considerable distance, for lodging the insets, besides, the profile of the insets is intricate and substantially differs from that of the rings themselves.

The invention avoids all these disadvantages by essentially simplifying the shape of the rings and of the insets at the points of engagement, and it is one object of the present invention to provide piston rings the insets of which are given the T-shaped or channel-shaped cross-section, while the ring parts are only provided with one or two tongues combining with the T- or channel-shaped cross-section of the inset so as to constitute a complete annular cross-section, which is therefore the same all along the ring circumference.

It is another object of the invention to provide piston rings the pressure springs of which are composed of two or more superposed plate springs of inwardly decreasing length, or each ring part with pressure springs extending over its entire length, said springs being, only at their ends, connected to the ends of the collateral ring part.

In the drawing the subject matter of the invention is diagrammatically represented by way of several embodiments, Fig. 1 being an overall view of a piston ring according to the invention partly broken off;

Fig. 2 shows the piston ring according to the invention together with plate springs;

Fig. 3 is the embodiment referring to the pressure springs extending over the whole ring part length, gripped only at the ends;

Figs. 4–10 represent the connection of the ring part ends with the insets on a somewhat larger scale, Figs. 4 and 5 being an outer view and a lateral view of the embodiment characterised by a T-shaped inset;

Fig. 6 is a cross-section taken on the line VI—VI of Fig. 4;

Fig. 7 is a perspective view of the T-shaped inset;

Figs. 8 and 9 are an outer view and a lateral view of the embodiment characterised by the channel-shaped inset; and Fig. 10 being a perspective view of said inset in connection with the one ring part end.

Fig. 1 shows by way of example a ring according to the invention composed of four parts. The ring parts 1–4 are complemented and connected by the insets 5. The pressure springs 6 force the ring parts and the insets on to the cylinder walls.

The construction of the insets is understood by referring to the Figs. 4–10. As shown in Fig. 7 the T-shaped inset 5 consists of a piece of rolled section metal, bent in accordance with the piston ring radius, the T-rail (flange) 10 corresponding to the width of the piston ring parts 1–4, while the T-web 9 plus the thickness of the T-rail 10 corresponds to the radial dimension of the piston ring profile (Fig. 6). The T-rail is lodged in a recess at the inner side of the piston ring. Said recess comprises two symmetrical undercuttings of the two tongues 8, 8, which between themselves symmetrically take up the T-web 9 of the inset (Figs. 4 and 5). As shown in Fig. 6 the cross-section composed of the T-cross-section and the tongues is essentially the same as that of the remaining ring. The T-rail 10 prevents the passage of gases through the joint of the abutting ring part ends in radial direction and the T-web 9 in the axial direction. 7, 7 are the cuts between the tongues 8, 8. 12 and 13 are the abutting ring part ends. In order to prevent also the passage of gases through the radial joints at the ends of the insets, extension lugs 10' may be provided at each end of the T-rail 10, to which an extension of the undercuttings of the tongues 8, 8 is bound to correspond. In this case the undercuttings reach under the full ring part.

With the embodiment according to the Figs. 8-10 having the channel-shaped inset 15, the sides or shanks of the channel 17, 17 are lodged in lateral recesses of the ring ends 12, 13, or in the recesses forming the tongues 14, whereas the connecting web or yoke of the channel-shaped profile—as with the other embodiments—is located in undercuttings of the tongues, which are extended in case of the analogous addition of extension lugs 16, 16.

In both cases i. e. in both embodiments the inner surfaces of the insets are lying flush with the inner circumferential surface of the piston ring.

The construction according to the invention presents the great advantage that the seal effected by the piston rings is almost perfect which results in an astonishingly high saving of fuel and lubricating oil. At that, the production of these simple fitting and connecting parts is easy, rapid and cheap. The insets can be formed out of rolled sections having a T- or a channel-shaped cross-section by simply cutting off sufficiently long pieces, eventually after executing the necessary milling for the formation of the lugs 10, 10' (Fig. 7) or 16, 16 (Fig. 10). Then the insets are bent and the necessary tongues and undercuttings are made on the ring end part e. g. by milling. It should be noted that the outer circumference of the piston ring is perfectly cylindrical owing to the exact mutual engagement of the inventive parts, notwithstanding their great simplicity, so that the inner surface of the cylinder is guaranteed against all unnecessary wear. This beneficial effect is, in part, due to the pressure springs of the piston ring parts.

The fixation of the insets in their operating position is assured e. g. by the ends of the pressure springs abutting on same (Fig. 1). The same result may, however, also be attained in another way. For the sake of simplicity, neither the insets nor their fixation is shown in the Figs. 2 and 3.

According to the embodiment shown in Fig. 2 the flat pressure springs consist of several superposed plates or laminated springs 25, 26, 27 the length of which decrease inwardly. These thin plate springs are capable, owing to their high elasticity, of sustaining the high temperatures and the great number of bending efforts far more easily than springs of heavier cross-sections and are, consequently, far more resistant than the latter.

The corrugated springs 19 as shown in Fig. 3, extend over the entire length of each ring part and are fastened at their ends only to the ring part 20 or abutting thereon at 21, eventually combined or connected with an analogously arranged and gripped arc-shaped spring 18, and are capable to adapt themselves automatically to the pressure on the circumference of the ring part varying during operation, so as to effect a most uniform distribution of the necessary pressure along the ring circumference which exercises a favorable influence on the life and durability of the spring.

While I have disclosed different embodiments of the present invention, it is to be understood that these embodiments are given by example only and not in any limiting sense, the scope of the invention being determined by the objects and the claims.

What I claim is:

1. In a split piston ring at least one integral piston ring portion, an inset disposed between the adjacent ends of the said ring portion, a projection extending from each end of the said ring portion in peripheral direction, the said inset having a cross-section complementary to the said projection and of constant cross-section substantially throughout its entire length in symmetrical arrangement in axial, radial and peripheral direction, and the inner and outer periphery and the side faces being flush with the corresponding faces of the said ring portion, and the said inset having parallel side faces, each inset being inserted into the said ring portion from the inner side of the said piston ring, and resilient means secured to the inner face of the said ring portion exerting pressure against the said inset in radial direction to provide a fluid-tight contact between the said inset and piston ring, respectively, and the cylinder wall.

2. The piston ring, as set forth in claim 1, in which said inset is of T-cross-section and the base of said T forming the inner face of said inset in the ring.

3. The piston ring, as set forth in claim 1, in which said inset is of channelled cross-section and the base of said channel forming the inner face of said inset in the ring.

4. The piston ring, as set forth in claim 1, in which said resilient means comprises a flat spring secured at its center to the inner face of the said ring portion and pressing with its outwardly bent ends against the ends of the said ring portion as well as against the inner face of the said inset.

5. The piston ring, as set forth in claim 1, in which the said resilient means comprises a plurality of flat springs disposed one above the other and of diminishing length in inward direction, the outermost of the said flat springs pressing against the ends of said ring portion and the said inset, respectively.

6. The piston ring, as set forth in claim 1, in which the said resilient means comprises a plurality of flat corrugated springs, each of said springs being fastened at their respective ends to the inner face of the said ring.

7. The piston ring, as set forth in claim 1, in which the said resilient means comprises a plurality of flat corrugated springs and arched springs securing together the said flat springs at their contact points.

ELEMÉR SZIGETI.

REFERENCES CITED

The following references are of record in the file of this patent:

UNITED STATES PATENTS

| Number | Name | Date |
|---|---|---|
| 1,147,228 | Fosston | July 20, 1915 |
| 1,378,251 | Lovell | May 17, 1921 |
| 1,556,312 | Davis | Oct. 6, 1925 |
| 1,775,648 | Lyman | Sept. 16, 1930 |

FOREIGN PATENTS

| Number | Country | Date |
|---|---|---|
| 24,832 | Great Britain | Nov. 24, 1898 |
| 286,735 | Italy | of 1931 |
| 761,106 | France | of 1934 |